United States Patent

Mataga et al.

Patent Number: 4,465,579
Date of Patent: Aug. 14, 1984

[54] BIPOLAR ELECTROLYTIC CELL

[75] Inventors: Sinichiro Mataga, Kudamatsu; Makoto Takenaka, Tokuyama, both of Japan

[73] Assignee: Tokuyama Soda Kabushiki Kaisha, Tokuyama, Japan

[21] Appl. No.: 368,447

[22] Filed: Apr. 14, 1982

[30] Foreign Application Priority Data

Apr. 20, 1981 [JP] Japan .................... 56-58588

[51] Int. Cl.³ .................. C25B 9/00; C25B 15/08
[52] U.S. Cl. .................... 204/255; 204/257; 204/279
[58] Field of Search .................. 204/254–256, 204/257–258, 253, 228, 237, 279

[56] References Cited

U.S. PATENT DOCUMENTS

| 3,324,023 | 6/1967 | Kircher | 204/255 X |
|---|---|---|---|
| 4,129,495 | 12/1978 | Fitch et al. | 204/253 |
| 4,196,069 | 4/1980 | Mose et al. | 204/257 |
| 4,197,169 | 4/1980 | Zahn et al. | 204/228 |
| 4,217,199 | 8/1980 | Cunningham | 204/256 |
| 4,295,953 | 10/1981 | Fuseya et al. | 204/279 X |
| 4,311,577 | 1/1982 | Kircher | 204/255 |
| 4,339,321 | 7/1982 | Kircher | 204/257 X |
| 4,378,286 | 3/1983 | Eng et al. | 204/279 X |

Primary Examiner—Donald R. Valentine
Attorney, Agent, or Firm—Wenderoth, Lind & Ponack

[57] ABSTRACT

A bipolar electrolytic cell has a plurality of unit cells electrically aligned in series, each of the unit cells being divided into an anode chamber and a cathode chamber by an ion-exchange membrane, and each of the anode and cathode chambers having a supply pipe and a discharge pipe which are respectively connected at one end to common headers. The other end of each of the supply or discharge pipes in the anode or cathode chambers is inserted deep into the respective electrode chamber so that at least 50% of the electrical resistance of the liquid in each pipe exists in the electrode chamber, and the wall of the inserted portion of each pipe electrically insulates the liquid in the pipe from a liquid in the electrode chamber.

4 Claims, 8 Drawing Figures

BIPOLAR ELECTROLYTIC CELL

This invention relates to a bipolar electrolytic cell comprised of a plurality of unit cells having a novel structure.

More specifically, this invention pertains to a bipolar electrolytic cell comprising a plurality of unit cells electrically aligned in series, each of the unit cells being divided into an anode chamber and a cathode chamber by an ion-exchange membrane, and each of the anode and cathode chambers having a supply pipe and a discharge pipe which are connected respectively to common headers, characterized in that a part, preferably a greater portion, of each of the supply and discharge pipes is inserted in the respective electrode chamber.

Methods have previously been known to obtain a halogen gas such as chlorine or bromine from an anode chamber and an alkali metal hydroxide such as sodium hydroxide or potassium hydroxide from a cathode chamber by the electrolysis of an aqueous solution of an alkali metal halide such as sodium chloride, potassium chloride or sodium bromide. The process called "the ion exchange membrane process" involving the use of an ion exchange membrane as a diaphragm separating an electrolytic cell into an anode chamber and a cathode chamber has gained widespread commercial acceptance because it produces alkali metal hydroxides of high quality with a reduced amount of power consumption per unit weight of the product.

It is well known that an electrolytic cell for performing the ion-exchange membrane electrolytic process can be one of two types, monopolar or bipolar. The bipolar electrolytic cell is advantageous over the monopolar electrolytic cell because it is compact in structure. But it has the defect that when a plurality of unit cells are arranged as in a filter press, a large amount of leakage current flows. Various attempts have therefore been made to prevent the flowing of a leakage current. For example, the specification of Japanese Laid-Open Patent Publication No. 142497/1976 published on Dec. 8, 1976 discloses that a heat-resistant and chlorine-resistant electrically insulating rubber tube can be used as a supply or discharge pipe connecting a nozzle of a header to a nozzle of an electrode chamber frame, and the inside diameter and length of the rubber tube are designed such that the ratio of the maximum leakage current to the current for electrolysis is kept at 0.04 or less. In adopting such a method, however, a very long rubber hose needs to be provided between the header nozzle and the nozzle of the electrode chamber frame, as shown in a working example of the above-cited Japanese patent document. Consequently, if it is desired to avoid loosening of the supply or discharge pipe, the header nozzle should be spaced from the nozzle of the electrode chamber frame by a distance corresponding to the length of the supply or discharge pipe, and the entire apparatus becomes large in size. This leads to the disadvantage that compactness characteristic of bipolar electrolytic cells cannot be attained and the resulting apparatus has a drastically reduced electrolyzing ability even when the floor space for it remains the same. Furthermore, it is impossible, in practice, to build and install supply and discharge pipes industrially with a high degree of precision without causing loosening thereof.

It may be possible, on the other hand, to install supply and discharge pipes compactly while allowing loosening thereof by using rubber tubes, flexible pipes and the like. But the pipes may undergo damage as a result of contact with each other or with component parts of the apparatus such as a stay, or may be insufficiently securely mounted. Consequently, the assembled electrolytic cell has a complex outside structure which may hamper inspection or cause great difficulties in repairing the apparatus. A further defect is that a liquid in a pipe has a high friction loss at the bent portions resulting from loosening, and when the pipe is a flexible pipe, the friction loss of a liquid in it increases. This exerts an increased load on a liquid supply pump.

It has been a technical problem, therefore, to develop a bipolar electrolytic cell comprising a plurality of series-aligned unit cells which minimizes the flowing of a leakage current, is compact in structure, has excellent operability, and ensures a low liquid friction loss during use.

We have now found that the aforesaid technical problem can be solved by inserting a part of the aforesaid supply or discharge pipe deep into the electrode chamber.

Thus, according to this invention, there is provided a bipolar electrolytic cell comprising a plurality of unit cells electrically aligned in series, each of the unit cells being divided into an anode chamber and a cathode chamber by an ion-exchange membrane, and each of the anode and cathode chambers having a supply pipe and a discharge pipe which are respectively connected at one end to common headers; characterized in that the other end of each of the supply or discharge pipes in the anode or cathode chambers is inserted deep into the respective electrode chamber so that at least 50% of the electrical resistance of a liquid in each pipe exists in the electrode chamber, and that the wall of the inserted portion of each pipe electrically insulates the liquid in the pipe from the liquid in the electrode chamber.

Since, according to the bipolar electrolytic cell of this invention, a part, preferably a greater portion, of each of the supply and discharge pipes is inserted deep into an electrode chamber, the supply and discharge pipes can be made longer than those in the aforesaid known bipolar cells in order to impart a higher electrical resistance to these pipes and minimize the leakage current. Consequently, the current efficiency of the electrolytic cell can be further increased. In addition, the added length portion of each supply or discharge pipe can be disposed within an electrode chamber, and the length of that part of the pipe which is located outside the bipolar cell can be kept shorter than that in a conventional bipolar cell. The aforesaid disadvantage in design can therefore be avoided. Moreover, since in the cell of this invention, a part of the supply or discharge pipe (for example, more than one-half of its total length) is inserted into the electrode chamber, the headers can be provided nearer to the bipolar cell even when the supply of discharge pipe is the same in length as that in a conventional bipolar cell, and the electrolytic cell can be built in a smaller size. Thus, that part of each supply or discharge pipe which is outside of the unit cell can be kept extremely short, and the causes of the damage to the pipes or the worsening of the operability can be removed. Furthermore, that part of each supply or discharge pipe which is to be within an electrode chamber can be a straight pipe having a smooth inner wall which is conducive to a lower friction loss than a bent pipe, a rubber pipe, a flexible pipe, etc.

Other features and advantages of the invention will become apparent from the following description, taken with the accompanying drawings, in which.

Figure 1:
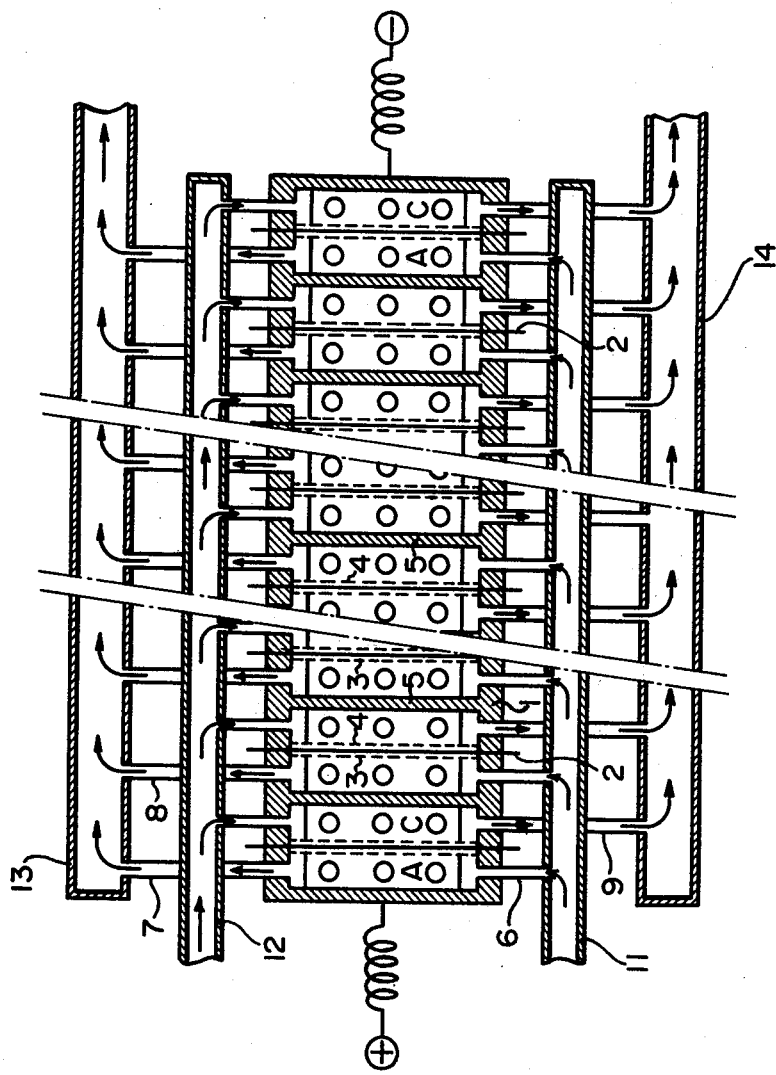
FIG. 1 is a diagrammatic view showing the concept of a filter press-type bipolar electrolytic cell.

In the present invention, it is desired that the length and sectional area (sometimes expressed in terms of diameter) of each supply or discharge pipe be made such that the amount of leakage current is not more than 1%, preferably not more than 0.5%, of the current used in the electrolysis. As the length of the pipe becomes larger, the electrical resistance in the pipe becomes higher and the leakage current becomes lower. Furthermore, the smaller the sectional area, the higher is the electrical resistance. Accordingly, the leakage current can be reduced by decreasing the cross sectional area of each of the supply and discharge pipes and increasing its length. If each of the pipes is made too slender and long, the pressure drop naturally increases so that the energy required to circulate the solution increases and a high pressure is exerted on the supply or discharge pipe. This results in liquid leakage or destruction of the apparatus. Thus, the diameter of the pipe can be selected generally to be in the range of 5 to 30 mm, and the length of the pipe in the range of 50 to 150 cm, according to the size of the unit cell, etc.

The characteristic feature of the present invention is that one end of each of the supply and discharge pipes extends deep into the space within the corresponding chamber of the unit cell and the proportion of that part of the pipe which is within the chamber of the unit cell is increased so that at least 50%, preferably 70 to 90%, of the total electrical resistance in the pipe exists in the inserted portion. For practical purposes, at least one-half of the entire length of each pipe may be a measure of at least 50% of the total electrical resistance. Hence, that part of the pipe which is outside the unit cell is extremely short, and the headers can be brought closer to the cell.

According to one embodiment of this invention, the friction loss of the liquid in the supply or discharge pipe can be reduced by forming at least that part of the supply or discharge pipe which is inserted in the unit cell as a straight hard pipe having a smooth inner surface, and at least that part of the pipe which is out of the unit cell, as a flexible hose. It is for the purpose of facilitating connection to a header that the part of the pipe which is located outside the unit cell is made of a flexible hose. Since bending of the hose at this part is inevitable and the friction loss of the liquid in this part increases, it is preferred to minimize the length of the flexible hose.

It will be understood from the essence of the present invention that the part of the supply or discharge pipe which is outside the unit cell should be at least partly, preferably wholly, comprised of an electrical non-conductor. It is also essential that the part of the pipe which is inserted in the unit cell should be of such a structure that a liquid in the pipe is not electrically connected to a liquid in the unit cell through the wall of the pipe; for example it should be made of an electrical non-conductor or a pipe at least the inside surface of which is coated with an electric non-conductor.

The bipolar cell itself has been known previously. This type of cell is characterized by the fact that a plurality of unit cells are electrically connected to each other in series, and liquids are supplied to, and discharged from, an anode chamber and a cathode chamber respectively through common headers. Thus, the headers are electrically connected to the unit cells through an electrolyte solution. If there is a potential difference in each unit cell, the current leaks through the headers. This relation will be described further with reference to FIGS. 1–3.

A bipolar electrolytic cell for the electrolysis of, for example, an aqueous solution of an alkali metal chloride includes a header 11 for supplying an aqueous solution of an alkali metal chloride, a header 12 for supplying water or an alkali metal hydroxide, a header 13 for discharging a recycle aqueous alkali metal chloride solution, and a header 14 for discharging the alkali metal hydroxide. The electrolytic cell is comprised of a plurality of unit cells 1 each of which has an anode 3, a cathode 4 and an ion-exchange membrane 2 separating the unit cell into an anode chamber and a cathode chamber. These electrodes in one unit cell are electrically connected to a cathode and an anode respectively of the adjoining unit cells through partitioning plates 5. The aqueous alkali metal chloride solution is supplied to the anode chamber from the header 11 through a supply pipe 6, and after being electrolyzed, reaches the header 13 through a discharge pipe 7. A feed liquid is supplied to the cathode from the header 12 through a pipe 8. The alkali metal hydroxide formed flows to the header 14 through a discharge pipe 9.

Figure 2:
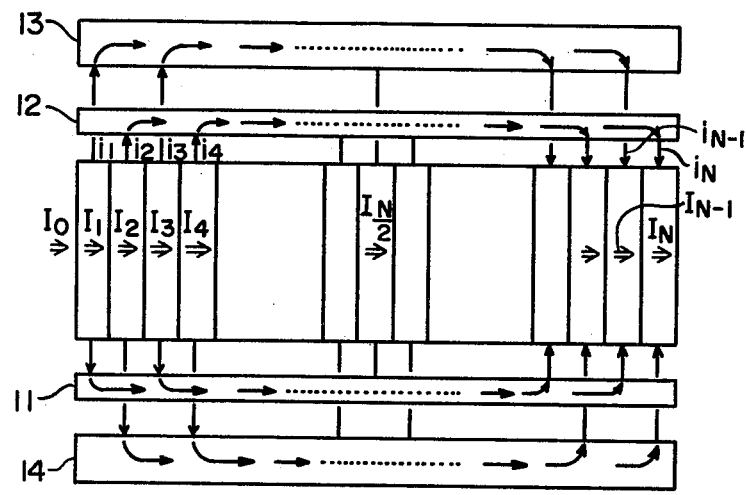
FIG. 2 is a schematic view showing the flow of electric current in the bipolar electrolytic cell.
Figure 3:
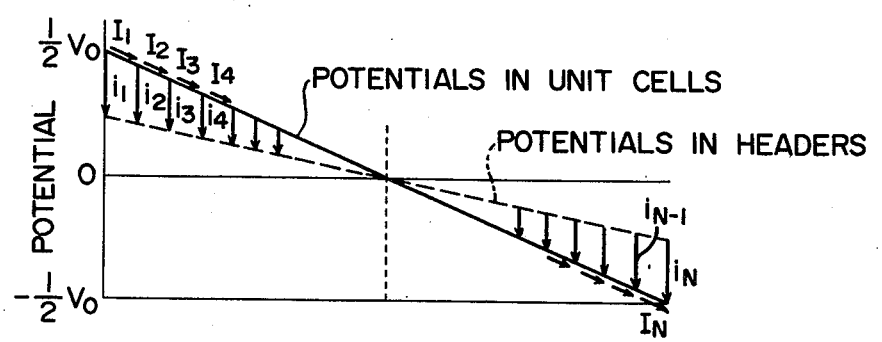
FIG. 3 is a diagram showing the relation between the flow and magnitude of a leakage current in the bipolar electrolytic cell.

An electric current flowing between the outermost anode A and the outermost cathode K serves for the electrolysis as shown mainly by $I_1 \ldots I_N$ in FIG. 2, but partly flows in the four headers as shown by $i_1 \ldots i_N$ through the supply and discharge pipes connected to the unit cells. The potentials in the unit cells with respect to the ground are high on the positive side of a power supply, zero approximately at the center, and low on the negative side, showing changes in an approximately straight-line relationship. Because of the resistance of the inside of the supply or discharge pipe of the unit cell, there is a difference between the potential of the inside of each unit cell and the potential of each header at that part to which the supply and discharge pipes of the unit cell are connected. Thus, as shown in FIG. 3, the potential of the inside of the header with respect to the ground is lower than the potential in the unit cells located on the positive side, crosses the latter in the central part, and is higher on the negative side, as shown approximately by a broken line. For this reason, the leakage current flows as shown by arrows $i_1, i_2 \ldots$. The current which has flowed from the unit cell toward the header does not return to the unit cell on the positive side, and is therefore wholly lost. At a part past the central portion where the potential of the inside of the header is higher than that of the inside of the unit cell, the current begins to flow toward the unit cell as shown by arrows $\ldots i_{N-1}, i_N$.

An example of the approximate calculation of the amount of the electric current lost by leakage in each header is shown below. For example, when the leakage current generated is 2% at the highest in each unit cell, namely $i_1/I_o = 0.02$ in FIGS. 2 and 3, the leakage current is symmetrical with respect to the N/2th unit cell as shown in FIG. 23. Thus, by examining the leakage current in the 1st to the N/2th unit cells, the amount of the current lost can be calculated as the loss ratio of the current efficiency.

The leakage current $i_1$ from the 1st unit cell is given by $i_1 = 0.02 \, I_o$ wherein $I_o$ is the amount of the current supplied. Likewise, the leakage current $i_2$ from the 2nd unit cell is given by $$i_2 = 0.02 \, I_o - \left(\frac{0.02}{N/2}\right) I_o.$$

The leakage current $i_3$ from the 3rd unit cell is given by $$i_3 = 0.02 \, I_o - 2\left(\frac{0.02}{N/2}\right) I_o.$$

Thus, the leakage current $i_n$ from the nth (n is not more than N/2) unit cell is given by the following equation.

$$i_n = 0.02 \, I_o \left(1 - \frac{n-1}{N/2}\right) \quad (1)$$

The loss ratio, $\Delta\eta_n$, of the current efficiency due to the leakage current from a given unit cell is expressed by the following equation.

$$\Delta\eta_1 = (i_1 \times {}^{N/2}/_{N/2})/I_o \quad (2)$$

$$\Delta\eta_2 = (i_2 \times {}^{(N/2 - 1)}/_{N/2})/I_o$$

$$\vdots$$

$$\Delta\eta_n = \left(i_n \cdot \left(\frac{N}{2} - (n-1)/N/2\right)\right)/I_o$$

The loss ratio, $\Delta\eta$, of the current efficiency in all the unit cells (i.e., the electrolytic cell) is given by the following equation.

$$\Delta\eta = \sum_{n=1}^{n=N/2} \Delta\eta_n = \Sigma \frac{1}{I_o}\left(i_n \frac{N/2 - (N/2 - 1)}{N/2}\right) \quad (3)$$

If equation (1) is applied to equation (3) and the resulting equation is expanded, the following equation is obtained.

$$\Delta\eta = \frac{0.02}{(N/2)^2} \sum_{n=1}^{n=N/2} (N/2 - n + 1)^2 \quad (4)$$

$$= \frac{0.02}{(N/2)^2} \cdot \frac{\{2(N/2)^3 + 3(N/2)^2 + (N/2)\}}{6}$$

$$= \frac{0.02}{3N} \{2(N/2)^2 + 3(N/2) + 1\}$$

If 40, 80 and 120 unit cells are respectively used in electrolytic cells, the loss ratios of the current efficiency in these electrolytic cells in accordance with equation (4) are 14.4%, 27.7% and 41.0%, respectively, which are surprisingly high. Accordingly, the leakage current from each unit cell must be minimized. For example, by decreasing the diameter of the supply or discharge pipe of each unit cell and increasing its length, the leakage current from it can be reduced. But this simultaneously results in a rise in the pressure of the supply or discharge liquid. Thus, the energy is lost, and in an extreme case, the apparatus may undergo destruction. From the standpoint of the cost of energy required for electrolysis, the loss ratio of the current efficiency in the electrolytic cell should desirably be kept at not more than 1%, preferably not more than 0.5%. Fpr example, if it is desired to maintain the loss ratio of the current efficiency in an electrolytic cell consisting of 40, 80 or 120 unit cells at 1%, the leakage current in each unit cell should be 0.14%, 0.07%, or 0.049%, respectively, by calculating it in accordance with the following equation which is obtained by transforming equation (4) using X for the coefficient 0.02 and 0.01 for $\Delta\eta$.

$$X = \frac{0.03N}{\{2(N/2)^2 + 3(N/2) + 1\}} \quad (5)$$

This means that when the number of unit cells increased to form an industrial apparatus, the amount of an electric current flowing through the headers should be drastically decreased.

According to this invention, the object of reducing the leakage current in an electric cell is achieved by increasing the length of the supply or discharge pipe to a relatively large extent and minimizing the friction loss of the liquids in the pipes. The length and diameter of each pipe can be determined easily by those skilled in the art in accordance of the above example of calculations. If the supply or discharge pipe is increased in length by lengthening that part of the pipe which is between a unit cell and a header as can generally be thought, this part of the pipe vibrates owing to the inertia of the flow of the liquid at the time of supplying or discharging in addition to the aforesaid flow resistance of the liquid, and the joint between the pipe and the unit cell or header undergoes fatigue fracture. In the case of a filter press-type electrolytic cell in which the unit cells are located close to each other, the above vibration may cause contacting of the adjacent supply and or discharge pipes and the contacting portions may wear away to leave holes. Pliable hoses are generally used as the supply and discharge pipes in order to make their installation easy and permit absorption of stresses generated between the unit cell and the header. This, however, causes the disadvantage that as a result of making the pipes slender and long, the friction losses of the liquids in the pipes increase markedly, and greater loads are exerted on the supply pumps.

The aforesaid defects or disadvantages have been overcome in accordance with this invention by inserting a considerable portion of the length each of the supply and discharge pipes in a unit cell. Furthermore, by using a straight pipe having a smooth inner surface as that part of the pipe which is within the unit cell, the friction loss of the liquid can be drastically reduced.

The construction of the unit cell in this invention will now be described more specifically with reference to FIGS. 4 to 8.

Figure 4:
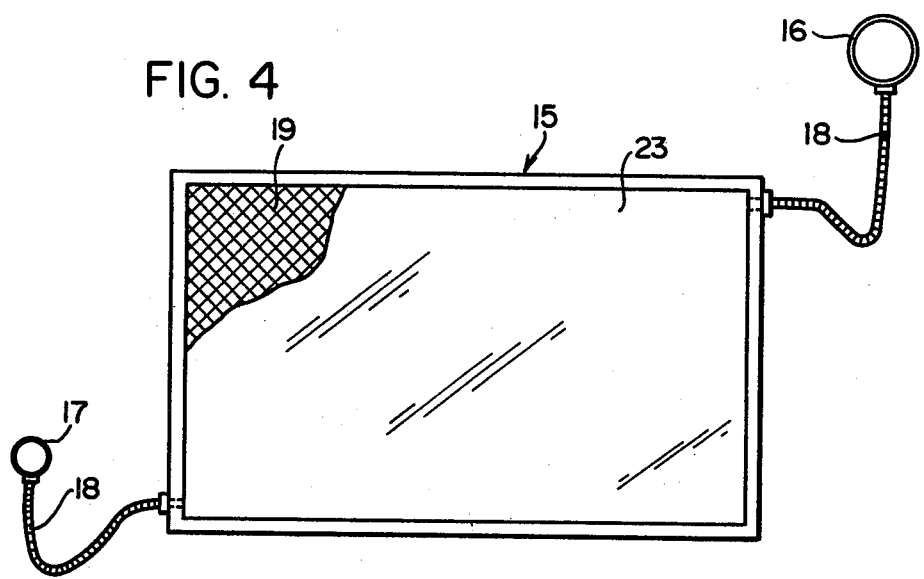
FIG. 4 is a sectional view of a unit cell and headers constructed in accordance with a prior art technique.

In FIG. 4, a discharge liquid header 16 and a supply liquid header 17 are connected respectively to a unit cell 15 by flexible hoses 18. The reference numeral 19 designates an electrode.

Figure 5:
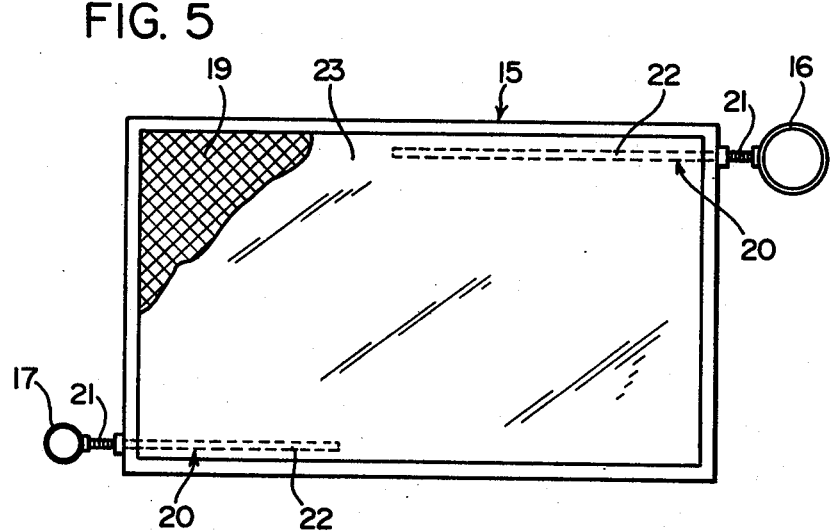
FIGS. 5, 6 and 7 are sectional views of unit cells and headers according to this invention.

In FIG. 5, supply and discharge pipes 20 are each comprised of an internal portion 22 positioned within a unit cell 15 and an external portion 21 located outside the unit cell. There is no particular restriction on the structure of the portion 22. Hence, the pipe 20 may be a one-piece unit, or be composed of a hard pipe fixed within the unit cell as the portion 22 and a flexible hose as the portion 21 joined to the hard pipe by means of a nozzle-like joint part.

Figure 6:
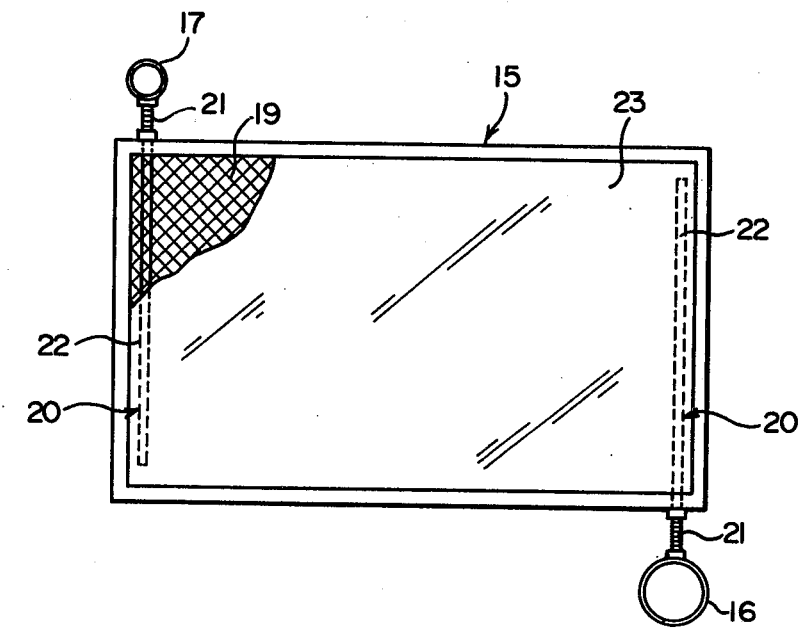
Figure 7:
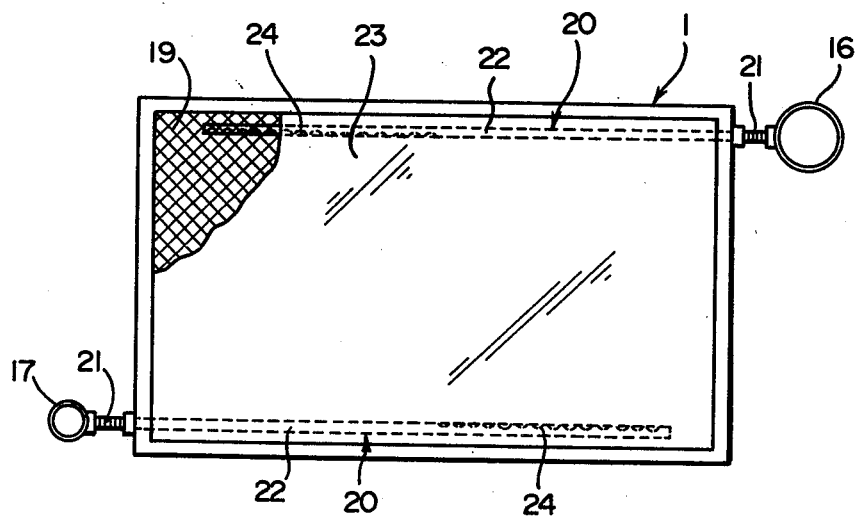

FIG. 6 shows an embodiment in which supply and discharge pipes 20 are positioned in the unit cell 15 vertically. In the embodiment shown in FIG. 7, a plurality of holes 24 are provided in the end portion of the pipe portion 22 within the unit cell of supply and discharge pipes to disperse the supply and discharge liquids. Formation of such holes over a great length of pipe portion 22 should be avoided because only that part of the portion of each pipe which is not provided with holes is available for liquid supply or discharge.

At least the inside or outside surface of the portion 22 of each supply or discharge pipe should be made of an electrically non-conductive material, preferably a pipe made of a non-conductive material, or a pipe (e.g., a metallic pipe) whose inside or outside wall is coated with an electrically non-conductive material. In other words, the liquid within the supply or discharge pipe 22 should be electrically insulated from the liquid in the unit cell and the wall of the unit cell. The non-conductive material preferably should be resistant to deterioration by liquids and gases within the unit cell. Specific examples of the non-conductive material include fluorine containing resins such as polytetrafluoroethylene, tetrafluoroethylene/perfluoroalkyoxyethylene copolymers, a tetrafluoroethylene/hexafluoropropylene copolymer, tetrafluoroethylene/ethylene copolymer, polytrifluorochloroethylene and polyvinylidene fluoride, polyolefins such as polypropylene and polyethylene, and polyvinyl chloride resins.

There is no particular restriction on the portion 22. A smooth pipe, particularly a circular pipe, having a smooth inner surface to reduce the friction loss of a liquid or gas passing through the pipe is suitable.

For example, by positioning 80% of the entire length of each of supply and discharge pipes in a unit cell, loads on the liquid circulating pump can be reduced by about 30% as compared with the conventional structure shown in FIG. 4 in which the pipes are composed solely of pliable hoses, if the same electrical resistance is imparted.

The length and diameter of the portion 22 of the supply or discharge pipe in accordance with this invention are not restricted in particular if they can form part of an electrical resistance between the unit cell and the header. Preferably, they are determined such that the portion 22 of the pipe, when filled with liquid, provides at least 50%, preferably at least 80%, of the electrical resistance.

Figure 8:
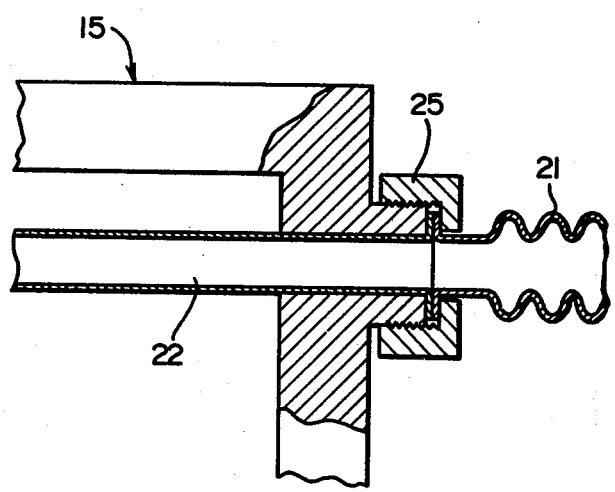
FIG. 8 is an enlarged sectional view showing an embodiment in which two constituent portions of a supply or discharge pipe are joined to each other near the surface of a unit cell.

It is preferred that the installation of the portion 22 of the supply or discharge pipe be effected so that the resulting structure does not hamper the supplying or discharging of a liquid or gas within the unit cell. Generally, it is convenient that the portion 22 be separable from the portion 21 located outside the unit cell. FIG. 8 is a sectional view showing an example of how these portions 21 and 22 are connected to each other. The portion 21 is connected to the portion 22 while insulating it from the unit cell. In the specific embodiment shown in FIG. 8, a pipe portion 22 is connected to a non-conductive pipe portion 21 processed to be pliable by means of a cap nut 25.

It will be appreciated from the foregoing description that according to this invention, flowing of a leakage current can be prevented by connecting each unit cell to headers by means of short supply and discharge pipes. It is possible therefore to prevent vibration of the pipes during passage of a liquid and to operate the unit cell without involving damage to the pipes and their joint portions. By using a smooth pipe as the internal portion of the supply or discharge pipe, loads on a liquid supply pump can be markedly reduced. Furthermore, in this invention, an electric resistance for preventing the leakage current can be provided within the unit cell. Thus, when it is necessary to vary the electric resistance to prevent the leakage current in each electrode chamber (for example, when the electrical conductivity of an anolyte solution differs from that of a catholyte solution), the electric resistance can be adjusted without changing the lengths of supply and discharge pipes connecting unit cells and headers.

While the present invention has been described hereinabove with reference to the specific embodiments shown in the drawings, it should be understood that various changes and modifications are possible without departing from the scope and spirit of the invention. For example, the specific structures of the supply and discharge pipes as described hereinabove need not to be employed in all of the supply and discharge pipes in the electrolytic cell of this invention, and if desired, such structures may be employed only in some of the supply and discharge pipes. Such as embodiment is also within the scope of the invention.

Furthermore, it will be obvious to those skilled in the art that the cation exchange membranes and other constituent elements of the bipolar electrolytic cell of the invention and the method of its operation may be those known heretofore in the art.

What we claim is:

1. A bipolar electrolytic cell comprising: a plurality of unit cells electrically aligned in series; an ion exchange membrane in each of the unit cells dividing the cell into an anode chamber and a cathode chamber; a supply pipe and a discharge pipe for each of the anode and cathode chambers which are respectively connected at one end to the corresponding chamber; common supply and discharge headers to which the other ends of said supply and discharge pipes are respectively connected; the one end of each of the supply and discharge pipes for the anode and the cathode chambers extending deep into the space within the corresponding chamber a distance such that at least 50% of the electrical resistance of the liquid in each pipe is due to the liquid within the part of the pipe in the space within the electrode chamber, the portion of each pipe within the space within the chamber including an electrically insulating material which electrically insulates the liquid in the pipe from the liquid in the electrode chamber.

2. The bipolar electrolytic cell of claim 1 wherein that part of each of the supply and discharge pipes which is inserted in the electrode chamber is a hard pipe made of an electrically non-conductive material, and that part of the pipe which is located outside the electrode chamber is a flexible hose.

3. The bipolar electrolytic cell of claim 1 wherein at least that part of each of the supply and discharge pipes which is within the electrode chamber is a hard metalic metallic pipe the inside surface of which is coated with an electically non-conductive material thereby electrically insulating a liquid in the pipe from a liquid in the electrode chamber.

4. The bipolar electrolytic cell of claim 1 wherein at least one-half of the entire length of each of the supply and discharge pipes is within the electrode chamber.

* * * * *